United States Patent
Balzarek et al.

(10) Patent No.: US 9,249,278 B2
(45) Date of Patent: Feb. 2, 2016

(54) CROSS-LINKABLE POLYMER DISPERSIONS, METHOD FOR THE PRODUCTION THEREOF AND USE THEREOF

(75) Inventors: Christoph Balzarek, Krefeld (DE); Martin Jakob, Kelkheim (DE)

(73) Assignees: Celanese Emulsions Gmbh, Sulzbach (Taunus) (DE); Oxea Deutschland GmbH, Oberhausen (DE)

( * ) Notice: Subject to any disclaimer, the term of this patent is extended or adjusted under 35 U.S.C. 154(b) by 1152 days.

(21) Appl. No.: 12/530,871

(22) PCT Filed: Feb. 13, 2008

(86) PCT No.: PCT/EP2008/001090
§ 371 (c)(1),
(2), (4) Date: Feb. 8, 2010

(87) PCT Pub. No.: WO2008/110242
PCT Pub. Date: Sep. 18, 2008

(65) Prior Publication Data
US 2010/0179272 A1    Jul. 15, 2010

(30) Foreign Application Priority Data

Mar. 14, 2007 (DE) .......................... 10 2007 012 247

(51) Int. Cl.
| C08L 25/10 | (2006.01) |
| C08L 31/02 | (2006.01) |
| C08L 31/04 | (2006.01) |
| C08L 33/06 | (2006.01) |
| C08L 33/08 | (2006.01) |
| C08L 33/10 | (2006.01) |
| C08K 5/07 | (2006.01) |
| C09J 131/04 | (2006.01) |
| C08L 1/32 | (2006.01) |
| C08L 29/04 | (2006.01) |

(52) U.S. Cl.
CPC ................. *C08K 5/07* (2013.01); *C09J 131/04* (2013.01); *C08L 1/32* (2013.01); *C08L 29/04* (2013.01); *C08L 2312/00* (2013.01)

(58) Field of Classification Search
CPC ............ C09J 131/04; C08K 5/07; C08L 1/32; C08L 29/04; C08L 2312/00
USPC .......... 524/503, 556, 557, 560, 561, 562, 563
See application file for complete search history.

(56) References Cited

U.S. PATENT DOCUMENTS

| 3,301,809 A | 1/1967 | Goldberg et al. |
| 3,563,851 A | 2/1971 | Armour et al. |
| 3,931,088 A | 1/1976 | Sakurada et al. |
| 3,932,335 A | 1/1976 | Gorton |
| 4,100,137 A | 7/1978 | Lemieux et al. |
| 4,118,357 A | 10/1978 | Brabetz et al. |
| 4,933,012 A * | 6/1990 | Goetze et al. ................. 524/413 |
| 5,545,684 A | 8/1996 | Jakob et al. |
| 6,054,519 A | 4/2000 | Jakob et al. |
| 6,265,028 B1 | 7/2001 | Zhao |
| 6,426,121 B1 * | 7/2002 | Goldstein et al. .......... 427/389.8 |
| 7,015,362 B2 | 3/2006 | Lappe et al. |
| 2007/0060702 A1 | 3/2007 | Gao et al. |
| 2007/0112117 A1 | 5/2007 | Weitzel |

FOREIGN PATENT DOCUMENTS

| DE | 2261402 | 4/1974 |
| DE | 2620738 A1 | 12/1977 |
| DE | 3942628 A1 | 6/1991 |
| DE | 4003422 A1 | 8/1991 |
| DE | 19830555 A1 | 1/2000 |
| EP | 0191460 A2 | 8/1986 |
| EP | 0191460 A3 | 8/1986 |
| EP | 0206059 A2 | 12/1986 |
| EP | 0206059 A3 | 12/1986 |
| EP | 0413136 A2 | 2/1991 |
| EP | 0413136 A3 | 2/1991 |
| EP | 0686682 A1 | 12/1995 |
| EP | 0829509 A1 | 3/1998 |
| EP | 0834530 A1 | 4/1998 |
| EP | 1134244 A2 | 9/2001 |
| EP | 1134244 A3 | 9/2001 |
| GB | 1297709 | 11/1972 |
| JP | 2001335763 A | 12/2001 |
| WO | WO 9812237 A1 | 3/1998 |

OTHER PUBLICATIONS

Search Report for PCT/EP2008/001090 dated Jun. 23, 2008, 6 pages.
International Preliminary Report on Patentability (Written Opinion) for PCT/EP2008/001090 dated Oct. 6, 2009, 7 pages.

* cited by examiner

*Primary Examiner* — David W Wu
*Assistant Examiner* — Marie Reddick
(74) *Attorney, Agent, or Firm* — Dority & Manning, P.A.

(57) ABSTRACT

Compositions containing an aqueous dispersion of selected polymers and selected polyaldehydes as crosslinking agents are described.
Adhesives having very high resistance to boiling water can be produced from these formulations.

24 Claims, No Drawings

CROSS-LINKABLE POLYMER DISPERSIONS, METHOD FOR THE PRODUCTION THEREOF AND USE THEREOF

The present invention relates to polymer dispersions comprising selected polyaldehydes as crosslinking agents. Aqueous dispersion adhesives, in particular those which are based on polyvinyl esters and have a pot life suitable in practice and whose films have high water resistance can preferably be formulated therefrom. The invention furthermore relates to the production of these polymer dispersions and the use thereof for the adhesive bonding of porous and semiporous substrates.

Aqueous polymer dispersions, in particular of polyvinyl esters, such as polyvinyl acetate, are used as PVAC glues for adhesive bonding of wood and other porous substrates. The chemistry of these adhesives produced industrially on a large scale has long been a subject of the patent literature and has been described in technical publications, for example in Wood Adhesives—Chemistry and Technology, volume 1, chapter 7, Marcel Dekker, New York, 1983.

A subgroup of the polyvinyl ester dispersions is formed by those whose films have high water resistance. The susceptibility of adhesive bonds based on polyvinyl ester to water is based for the most part on the presence of hydrophilic stabilizers, in particular of polyvinyl alcohol, which are usually used in the production of adhesive dispersion. A possible way of achieving an improvement in the water resistance therefore consists, for example, in reducing the hydrophilicity of the adhesive by crosslinking of the polyvinyl alcohol with reactive compounds.

Thus, according to DE-B-2,261,402, a polyvinyl ester dispersion with which a crosslinking resin, for example a urea-formaldehyde resin, is mixed, in combination with a free organic or inorganic acid or an acidic metal salt, gives waterproof adhesive bonds.

A further long-known way of reducing the hydrophilicity of the adhesive consists in the copolymerization of vinyl esters in the presence of monomers, such as N-methylol (meth)acrylamide, which are crosslinkable with polyvinyl alcohol. In combination with acidic curing agents, for example organic acids or acidic ammonium salts, water-resistant adhesives are obtained. Examples of adhesive systems crosslinking under acid catalysis are to be found in U.S. Pat. No. 3,301,809, U.S. Pat. No. 3,563,851, DE-C 26 20 738 and DE-A 39 42 628.

In relation to these adhesive systems crosslinking exclusively under catalysis by acidic curing agents, it is also known that various additives which increase the water resistance of adhesive bonds produced with these dispersions can be subsequently added to the dispersions. The effect of these additives is based on crosslinking reactions which include the polyvinyl alcohol. Hydrophobic aliphatic or aromatic polyisocyanates are proposed as additives in U.S. Pat. No. 3,931,088; or, in EP-A-206,059, polyisocyanate formulations which are dispersible in water and in which the isocyanate groups are partly masked with emulsifiers.

A further group of additives which improve the water resistance of dispersion adhesives constitutes polyfunctional aldehydes. In U.S. Pat. No. 3,932,335, polyvinyl ester dispersions which give waterproof adhesive bonds are obtained by addition of glyoxal in combination with water-soluble polyols.

EP-A-191,460 describes polyvinyl acetate dispersions which are stabilized with polyvinyl alcohol and crosslinked with glutaraldehyde and which give films resistant to boiling water over a period of at least 30 minutes.

EP-A-834,530 describes water-resistant compositions containing a polyvinyl alcohol having an amino group bonded to a phenyl radical, and a composition imparting water resistance, namely polyepoxides, aldehydes, polyisocyanates or water-soluble oxidizing agents.

EP-A-413,136 describes polymer compositions and adhesives which are produced therefrom and give adhesive bonds having good water resistance. The adhesives contain not only water-soluble polyvinyl alcohol but also an amine compound, a crosslinking agent and at least one water-insoluble and base-soluble or -swellable substance. Optionally, the adhesives may also contain an aqueous emulsion. Crosslinking agents used are compounds which can be reacted with the polyvinyl alcohol and the amine compound. Epoxy compounds, aldehyde-based compounds, aziridine compounds, isocyanate-based compounds, aminoplast compounds and polyvalent metal compounds may be mentioned as examples.

WO-A-98/12,237 describes self-crosslinking aqueous dispersions. These contain not only selected vinyl polymer components but also crosslinking agent, additives and solvent. Crosslinking agents disclosed are aliphatic dialdehydes, such as glyoxal, and cyclic dialdehydes, such as furaldehyde, or dialkoxyfurans or -pyrans. Dispersions can be used as back coatings or as binders.

JP-A 2001/335763 describes two-component room temperature-curing adhesive compositions based on polyvinyl esters provided with amino groups. Dialdehyde-starch is used as a second liquid component. These products are obtained by oxidative digestion of starch but are themselves very readily water-soluble and do not yet meet the requirements regarding a high degree of exposure of the adhesive bonds to water.

DE-A-198 30 555 describes the use of aqueous polymer formulations containing a film-forming polymer in the form of a dispersion for the coating of polyurethane-containing substrates. Polymers containing groups derived from ethylenically unsaturated ureas, thioureas or cyclic derivatives thereof and copolymerized with acrylates, vinyl esters or vinyl aromatics in combination with di- or polyaldehydes are used. In addition to aliphatic dialdehydes, terephthalaldehyde is proposed. These systems are crosslinked under alkaline conditions so that they are not suitable for use in dispersions which have a composition predominantly based on polymers which can readily undergo alkaline hydrolysis, such as, for example, based on vinyl esters.

EP-A-686,682 discloses aqueous polyvinyl ester dispersion adhesives which contain polymeric protective colloids, water-soluble compounds complexable therewith and at least partly masked polyaldehydes having at least three carbon atoms, from which aldehyde groups can be liberated in a controlled manner in acidic media. In addition to pot lives suitable in practice, these adhesives have very good adhesive properties and the adhesive bonds possess very good water resistance. With these dispersions, it is possible to formulate adhesives which cover all groups of requirements of DIN EN 204, i.e. cold water resistance according to durability class D3 and hot water resistance according to durability class D4.

The market is increasingly requiring products which satisfy more demanding standards where the adhesive bonds are, for example, also exposed to repeated cycles comprising treatment with boiling water and drying. This can be effected by addition of special curing agents, e.g. phenol-formaldehyde resins, or isocyanate-based systems. Such two-component adhesives based on emulsion polymers and polyisocyanates are disclosed, for example in EP-A 1 134 244 and many other documents. A known disadvantage of these systems is the foam formation due to carbon dioxide liberated as a result of the gradual hydrolysis of the isocyanate groups in the aqueous phase. Products having a comparable use profile which contain other crosslinking systems and are based on polymers other than polyurethanes have not been disclosed to date.

It was accordingly the object to provide aqueous dispersions which can be processed, for example, to give adhesive bonds or to give other products which have very high resistance to boiling water and also withstand several cycles consisting of tests involving exposure to boiling water.

A further object consisted in the provision of dispersions which can be processed to give products, for example to give films, which have very high water resistance and can be formulated from comparatively simple and readily available chemicals.

It has now been found that these objects can be achieved by selected compositions.

The present invention relates to a composition containing an aqueous polymer dispersion, the polymer being derived from at least one ethylenically unsaturated monomer capable of free radical polymerization, and containing at least one protective colloid and/or at least one emulsifier, and at least one cycloaliphatic hydrocarbon having two to six aldehyde groups, the polymer and/or the protective colloid and/or the emulsifier having groups crosslinkable with aldehydes.

In a preferred embodiment, the invention relates to a multicomponent composition containing at least one component A and at least one component B, component A being an aqueous polymer dispersion having a pH of from 2 to 7, which
  a) contains at least one polymer which is selected from the group consisting of the polymers derived from vinyl esters, the polymers derived from esters of α,β-ethylenically unsaturated $C_3$-$C_8$-mono- or dicarboxylic acids and/or the polymers derived from alkenylaromatics, and
  b) contains at least one protective colloid and/or at least one emulsifier,
  c) the polymer and/or the protective colloid and/or the emulsifier having groups crosslinkable with aldehydes, and
component B containing a cycloaliphatic hydrocarbon having two to six aldehyde groups.

The present invention also relates to the crosslinkable composition obtained by combination of components A and B, and the crosslinked product obtainable from the crosslinkable compositions.

The emulsion polymers which are used as the polymer base in the compositions according to the invention have a composition substantially based on one or more ethylenically unsaturated compounds; these are preferably vinyl esters and/or polymers derived from esters of α,β-ethylenically unsaturated $C_3$-$C_8$-mono- or dicarboxylic acids and/or from alkenylaromatics.

In principle, the following groups of monomers are suitable as a basis for said polymer classes:

One group is formed by vinyl esters of monocarboxylic acids having one to eighteen carbon atoms, for example vinyl formate, vinyl acetate, vinyl propionate, vinyl isobutyrate, vinyl valerate, vinyl pivalate, vinyl 2-ethylhexanoate, vinyl decanoate, isopropenyl acetate, vinyl esters of saturated branched monocarboxylic acids having five to fifteen carbon atoms in the acid radical, in particular vinyl esters of Versatic™ acids, vinyl esters of long-chain saturated or unsaturated fatty acids, such as, for example, vinyl laurate, vinyl stearate, and vinyl esters of benzoic acid and substituted derivatives of benzoic acid, such as vinyl p-tert-butylbenzoate. Among these, however, vinyl acetate is particularly preferred as a main monomer.

A further group of monomers which can be used in addition to the vinyl esters and/or esters of α,β-ethylenically unsaturated $C_3$-$C_8$-mono- or dicarboxylic acids and/or alkenylaromatics is formed by aliphatic, monoolephinically or diolephinically unsaturated, optionally halogen-substituted hydrocarbons, such as ethene, propene, 1-butene, 2-butene, isobutene, conjugated $C_4$-$C_8$-dienes, such as 1,3-butadiene, isoprene, chloroprene, vinyl chloride, vinylidene chloride, vinyl fluoride or vinylidene fluoride.

A further group of monomers is formed by esters of α,β-ethylenically unsaturated $C_3$-$C_8$-mono- or dicarboxylic acids with preferably $C_1$-$C_{18}$-alkanols and in particular $C_1$-$C_8$-alkanols or $C_5$-$C_8$-cycloalkanols. The esters of the dicarboxylic acids may be monoesters or preferably diesters. Suitable $C_1$-$C_8$-alkanols are, for example, methanol, ethanol, n-propanol, isopropanol, 1-butanol, 2-butanol, isobutanol, tert-butanol, n-hexanol and 2-ethylhexanol. Suitable cycloalkanols are, for example, cyclopentanol or cyclohexanol. Examples are esters of acrylic acid, of methacrylic acid, of crotonic acid, of maleic acid, of itaconic acid, citraconic acid or of fumaric acid, such as methyl (meth)acrylate, ethyl (meth)acrylate, isopropyl (meth)acrylate, n-butyl (meth)acrylate, isobutyl (meth)acrylate, 1-hexyl (meth)acrylate, tert-butyl (meth) acrylate, 2-ethylhexyl (meth)acrylate, di-n-methyl maleate or fumarate, di-n-ethyl maleate or fumarate, di-n-propyl maleate or fumarate, di-n-butyl maleate or fumarate, diisobutyl maleate or fumarate, di-n-pentyl maleate or fumarate, di-n-hexyl maleate or fumarate, dicyclohexyl maleate or fumarate, di-n-heptyl maleate or fumarate, di-n-octyl maleate or fumarate, di(2-ethylhexyl) maleate or fumarate, di-n-nonyl maleate or fumarate, di-n-decyl maleate or fumarate, di-n-undecyl maleate or fumarate, dilauryl maleate or fumarate, dimyristyl maleate or fumarate, dipalmitoyl maleate or fumarate, distearyl maleate or fumarate and diphenyl maleate or fumarate.

A further group of monomers is formed by the alkenylaromatics. These are monoalkenylaromatics. Examples of these are styrene, vinyltoluene, vinylxylene, α-methylstyrene or o-chlorostyrene.

Said monomers form as a rule the main monomers, which together usually account for a proportion of more than 50% by weight, preferably more than 75%, based on the total amount of the monomers to be polymerized by the free radical aqueous polymerization method.

The monomers should preferably be chosen so that a polymer or copolymer having adhesive properties forms. This can be effected in a manner known per se by adjusting the glass transition temperature of the resulting polymers.

Preferred main monomers have a composition based on the following polymer classes:

Homo- or copolymers of one or more vinyl esters, in particular of vinyl acetate; copolymers of vinyl esters with esters of α,β-ethylenically unsaturated $C_3$-$C_8$-mono- or dicarboxylic acids with $C_1$-$C_8$-alkanols, in particular esters of (meth)acrylic acid and maleic acid or fumaric acid; copolymers of vinyl esters, in particular vinyl acetate, with ethene; terpolymers of vinyl esters, ethene and esters of α,β-ethylenically unsaturated $C_3$-$C_8$-mono- or dicarboxylic acids with $C_1$-$C_8$-alkanols, in particular esters of (meth)acrylic acid and maleic acid or fumaric acid; homo- or copolymers of esters of (meth) acrylic acid; copolymers of styrene with butadiene and/or esters of α,β-ethylenically unsaturated $C_3$-$C_8$-mono- or dicarboxylic acids with $C_1$-$C_8$-alkanols, in particular esters of (meth)acrylic acid.

Of course, further comonomers which modify the properties in a targeted manner can be concomitantly used in the polymerization. Such auxiliary monomers are usually incorporated in the form of polymerized units only as modifying monomers in amounts, based on the total amount of the monomers to be polymerized, of less than 50% by weight, as a rule of less than 20, preferably less than 10, percent by weight.

These monomers serve for further stabilizing dispersions, can improve the film cohesion or other properties by crosslinking during the polymerization or during the film formation and/or, by means of suitable functionality, react with the component B with crosslinking.

Monomers which can serve for further stabilization are as a rule monomers which have an acid function and/or salts thereof. This group includes, for example, α,β-monoethylenically unsaturated mono- and dicarboxylic acids having three to ten carbon atoms, ethylenically unsaturated sulfonic acids, ethylenically saturated phosphonic acids or dihydrogen phosphates and water-soluble salts thereof, for example sodium salts thereof. Preferred monomers from this group are vinylsulfonic acid and its alkali metal salts, acrylamidopropanesulfonic acid and its alkali metal salts, ethylenically unsaturated $C_3$-$C_8$-carboxylic acids and $C_4$-$C_8$-dicarboxylic acids, e.g. itaconic acid, crotonic acid, vinylacetic acid, acrylamidoglycolic acid and in particular acrylic acid and methacrylic acid.

Examples of crosslinking auxiliary monomers are monomers having two or more vinyl radicals, monomers having two or more vinylidene radicals and monomers having two or more alkenyl radicals. The diesters of dihydric alcohols with α,β-monoethylenically unsaturated monocarboxylic acids, among which acrylic and methacrylic acid are preferred, the diesters of dibasic carboxylic acids with ethylenically unsaturated alcohols, other hydrocarbons having two ethylenically unsaturated groups or the diamides of difunctional amines with α,β-monoethylenically unsaturated monocarboxylic acids are particularly advantageous.

Examples of such monomers having two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates or methacrylates and ethylene glycol diacrylates or methacrylates, 1,2-propylene glycol dimethacrylate, 1,3-propylene glycol dimethacrylate, 1,3-butylene glycol dimethacrylate, 1,4-butylene glycol dimethacrylates, hexanediol diacrylate, pentaerythritol diacrylate and divinyl benzene, vinyl methacrylate, vinyl acrylate, vinyl crotonate, allyl methacrylate, allyl acrylate, diallyl maleate, diallyl fumarate, diallyl phthalate, cyclopentadienyl acrylate, divinyl adipate or methylenebisacrylamide.

However, it is also possible to use monomers having more than two double bonds, for example tetraallyloxyethane, trimethylolpropane triacrylate or triallyl cyanurate.

A further group of auxiliary monomers is suitable for reacting either by self-crosslinking or with a suitable monomeric reactant and/or with the aromatic or cycloaliphatic polyaldehyde under selected conditions with crosslinking:

This group includes monomers having N-functional groups, including in particular (meth)acrylamide, allyl carbamate, acrylonitrile, methacrylonitrile, N-methylol(meth)acrylamide, N-methylolallyl carbamate and N-methylol esters, alkyl ethers or Mannich bases of N-methylol(meth)acrylamide or N-methylolallyl carbamate, acrylamidoglycolic acid, methyl acrylamidomethoxyacetate, N-(2,2-dimethoxy-1-hydroxyethyl)acrylamide, N-dimethylaminopropyl(meth)acrylamide, N-methyl(meth)acrylamide, N-butyl(meth)acrylamide, N-cyclohexyl(meth)acrylamide, N-dodecyl(meth)acrylamide, N-benzyl(meth)acrylamide, p-hydroxyphenyl-(meth)acrylamide, N-(3-hydroxy-2,2-dimethylpropyl)methacrylamide, ethylimidazolidone (meth)acrylate, N-(meth)acryloyloxy-ethylimidazolidin-1-one, N-(2-methacrylamidoethyl)imidazolin-2-one, N-[3-allyloxy-2-hydroxypropyl]aminoethyl] imidozilin-2-one, N-vinylformamide, N-vinylpyrrolidone or N-vinylethyleneurea.

A further group of auxiliary monomers is formed by hydroxyfunctional monomers, such as the $C_1$-$C_9$-hydroxyalkyl methacrylates and acrylates, such as n-hydroxyethyl, n-hydroxypropyl or n-hydroxybutyl acrylate and methacrylate and adducts thereof with ethylene oxide or propylene oxide.

A further group of auxiliary monomers is formed by those which are crosslinkable via carbonyl groups or self-crosslinking. Examples are diacetoneacrylamide, allyl acetoacetate, vinyl acetoacetate and acetoacetoxyethyl acrylate or methacrylate.

A further group of auxiliary monomers consists of monomers containing silane groups, e.g. vinyltrialkoxysilanes, such as vinyltrimethoxysilane, vinyltriethoxysilane, alkylvinyldialkoxysilanes or (meth)acryloyloxy-alkyltrialkoxysilanes, e.g. (meth)acryloyloxyethyltrimethoxysilane or (meth)acryloyloxypropyltrimethoxysilane.

A further group of auxiliary monomers consists of monomers containing epoxy groups, such as, for example, allyl glycidyl ether, methacryloyl glycidyl ether, butadiene monoepoxides, 1,2-epoxy-5-hexene, 1,2-epoxy-7-octene, 1,2-epoxy-9-decene, 8-hydroxy-6,7-epoxy-1-octene, 8-acetoxy-6,7-epoxy-1-octene, N-(2,3-epoxy)propylacrylamide, N-(2,3-epoxy)propylmethacrylamide, 4-acrylamidophenyl glycidyl ether, 3-acrylamidophenyl glycidyl ether, 4-methacrylamidophenyl glycidyl ether, 3-methacrylamidophenyl glycidyl ether, N-glycidyloxymethylacrylamide, N-glycidyloxypropylmethacrylamide, N-glycidyloxyethylacrylamide, N-glycidyloxyethylmethacrylamide, N-glycidyloxypropylacrylamide, N-glycidyloxypropylmethacrylamide, N-glycidyloxybutylacrylamide, N-glycidyloxybutylmethacrylamide, 4-acrylamidomethyl-2,5-dimethylphenyl glycidyl ether, 4-methacrylamidomethyl-2,5-dimethylphenyl glycidyl ether, acrylamidopropyldimethyl-(2,3-epoxy)propylammonium chloride, methacrylamidopropyldimethoxy-(2,3-epoxy)propylammonium chloride and glycidyl methacrylate.

In addition to the homo- or copolymeric polymers, the dispersions according to the invention preferably contain protective colloids. These are polymeric compounds which are added during the emulsion polymerization and stabilize the dispersion.

Suitable protective colloids are, for example, polyvinyl alcohols, polyalkylene glycols, alkali metal salts of polyacrylic acids and polymethacrylic acids, cellulose, starch and gelatin derivatives or polymers derived from acrylic acid, methacrylic acid, maleic acid, maleic anhydride, methyl vinyl ether, styrene, 2-acrylamido-2-methylpropanesulfonic acid and/or 4-styrenesulfonic acid and the alkali metal salts of said polymers, but also polymers derived from N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, acrylates carrying amino groups, methacrylates, acrylamides and/or methacrylamides. A detailed description of further suitable protective colloids is to be found in Houben-Weyl, Methoden der organischen Chemie [Methods of Organic Chemistry], volume XIV/1, Makromolekulare Stoffe [Macromolecular Substances], Georg-Thieme-Verlag, Stuttgart, 1961, pages 411 to 420.

If the protective colloids are polyvinyl alcohol, in particular polyvinyl alcohol having a degree of hydrolysis of 60-100 mol %, preferably from 70 to 98 mol %, and viscosities of the 4% strength by weight aqueous solutions at 20° C. or from 2 to 70 mPa·s or mixtures of these types are used. In addition to "homopolymeric" polyvinyl alcohol, i.e. polyvinyl alcohol consisting only of vinyl alcohol groups and residual vinyl acetate groups, copolymeric or functionalized polyvinyl alcohols can be used, for example reaction products of polyvinyl alcohol with diketene or with polyvinyl alcohol types carrying carboxyl groups, thiol groups, formamido groups, amino groups, arylamino groups, sulfate groups, sultanate groups, phosphonate groups, quaternary ammonium groups and other functional groups.

Protective colloids which can form complexes or coordinate bonds with a group of compounds which is selected from the group consisting of the acidic metal salts or salts or acids of oxo anions, in particular aluminum chloride, aluminum nitrate, titanium sulfate or zirconium oxychloride, or phosphoric acid or boric acid, can particularly preferably be used in the polymer dispersion.

Said polymeric stabilizers can optionally be added to the dispersion also during or after the polymerization.

The proportion of the polymeric protective colloids is preferably from 1 to 35% by weight, in particular from 2 to 20% by weight, based on the solids content of the polymer dispersion.

In addition to or instead of the protective colloids, polymer dispersions can also be stabilized with emulsifiers. These may be ionic, preferably anionic, or in particular nonionic wetting agents. A list of suitable emulsifiers is to be found in Houben-Weyl, Methoden der organischen Chemie [Methods of Organic Chemistry], volume XIV/I, Macromolekulare Stoffe [Macromolecular Substances], Georg-Theime-Verlag, Stuttgart, 1961, pages 192-208).

The proportion of the emulsifiers may be up to 10% by weight, based on the solids content of the polymer dispersion. Emulsifiers may be present during the polymerization itself and/or may be added thereafter.

Dispersions which contain protective colloids and optionally up to 2% by weight, based on the solids content of the polymer dispersion, of ionic and/or nonionic emulsifiers are preferred.

The polymer and/or the protective colloid and/or the emulsifier has groups crosslinkable with aldehydes. These are, for example, activated methylene groups, amino groups, amide groups, ureido groups and in particular hydroxyl groups.

Aqueous dispersions which have protective colloids with hydroxyl groups, in particular polyvinyl alcohol and alkylated celluloses, are particularly preferably used.

According to the invention, cycloaliphatic hydrocarbons having two to six aldehyde groups are used as polyaldehydes.

The present invention also relates to the use of cycloaliphatic polyaldehydes as crosslinking agents in adhesive formulations and in binder formulations.

Cycloaliphatic polyaldehydes are derived from mono- or polycyclic, preferably from bicyclic, hydrocarbons. Examples of monocyclic hydrocarbons are cyclopentane, cyclohexane, cycloheptane or cyclooctane.

Examples of bicyclic hydrocarbons are norbornane, norbornene or tricyclodecane ("TCD"). These polyaldehydes have in particular two to four aldehyde groups. These can be covalently bonded directly to the cycloaliphatic nucleus or via a bridge group, for example an alkylene group. Examples of preferred compounds of this type are cyclohexanedialdehyde, cyclopentanedialdehyde, vinylcyclohexanedialdehyde, norbornanedi-aldehyde, norbornenedialdehyde, ethyl-norbornanedialdehyde or particularly preferably {3[4],8(9)-bis(formyl)tricyclo[5.2.1.0$^{2.6}$]decane or "tricyclodecanedialdehyde" (="TCD-dialdehyde").

Particularly preferred dialdehydes have the following structures of the formulae I to IX

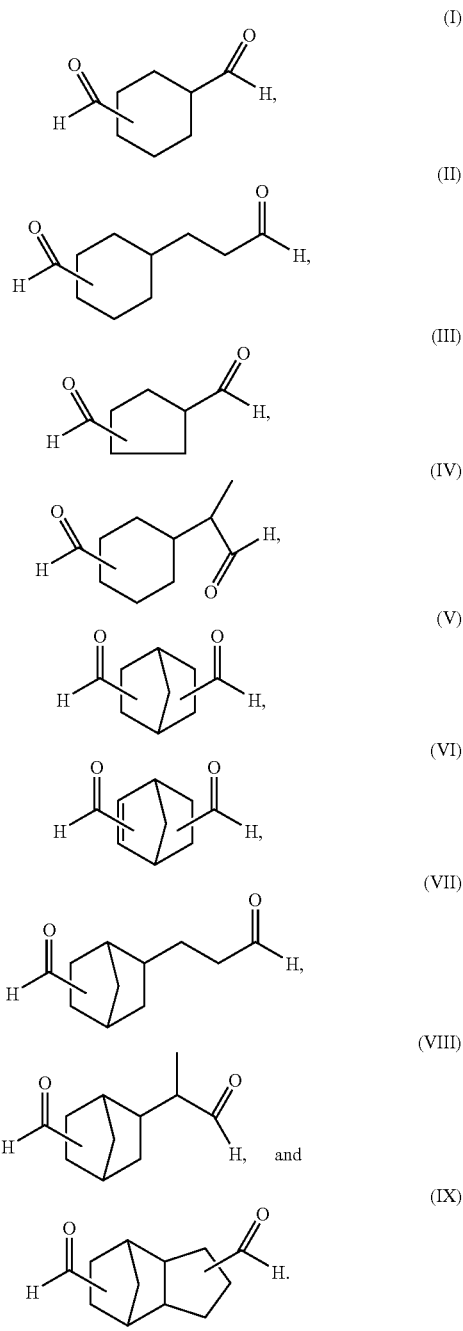

The polyaldehydes used according to the invention are compounds which are known per se and some of which are commercially available or which can be prepared by known processes of organic chemistry.

The dialdehydes of mono- or bicyclic hydrocarbons, which dialdehydes are listed above as being particularly preferred, can be prepared, for example, by hydroformylation of the corresponding alkenyl compounds.

Thus, the particularly preferably used TCD-dialdehyde can be prepared, for example, by the process disclosed in US-A-2005/0101805.

The amount of polyaldehydes used is from 0.001% by weight to 25% by weight, based on the solid substance of the polymer dispersion, and depends on the type of polyaldehyde used and on the composition of the dispersion.

The preferred range is from 0.01 to 20% by weight, in particular from 0.1 to 15% by weight, based on the solid substance of the polymer dispersion.

The composition according to the invention may contain further customary additives which are typically used in adhesive formulations or in building material formulations. These include, for example, film formation auxiliaries for reducing the minimum film formation temperature ("MFT depressants"), plasticizers, buffers, pH adjusters, dispersants, antifoams, fillers, dyes, pigments, silane coupling agents, thickeners, viscosity regulators, solvents and/or preservatives.

One group of additives comprises further crosslinking compounds (external crosslinking agents) which can be added in low molecular weight form or as crosslinker resins. These can even further improve the effect of improvement of the resistance to boiling water, in combination with the cycloaliphatic polyaldehyde, and are therefore particularly preferably used in the compositions according to the invention.

Suitable external crosslinking agents are, for example, phenyl-formaldehyde resins, resorcinol-formaldehyde resins, melamine-formaldehyde resins, hydroxymethyl-substituted imidazolidinones or thioimidazolidinones, hydroxymethyl-substituted pyrimidinones or hydroxymethyl-substituted triazinones or glycolurils or the self-condensation products thereof or mixed condensates of two or more of said compounds, or a mixture of two or more of said compounds. 1,3-bis(hydroxymethyl)-4-methoxy-4,5,5-trimethyl-2-imidazolidinone, N,N'-dimethylol-4-methoxy-5,5-dimethylpropyleneurea, N,N',N'',N'''-tetrakis(hydroxymethyl)glycoluril, 4,5-dihydroxy-1,3-bis(methoxymethyl)-2-imidazolidinone, 4,5-dihydroxy-1,3-bis(hydroxymethyl)imidazolidin-2-one, tetrahydro-1,3-bis(hydroxymethyl)-4-methoxy-5,5-dimethylpyrimidin-2(1H)-one, 4,5-dihydroxy-1,3-dimethylol-2-imidazolidinone, 4,5-dihydroxy-1,3-dimethyl-2-imidazolidinone, tetrahydro-1,3-bis(hydroxymethyl)-4-hydroxy-5,5-dimethyl-(1H)-pyrimidin-2-one (=1,3-dimethylol-4-methoxy-5,5-dimethylpropyleneurea), tetrahydro-1,3-bis (hydroxymethyl)-4-alkoxy-5,5-dimethyl-(1H)-pyrimidin-2-one and N,N',N'',N'''-tetrakis(hydroxymethyl)glycoluril may be mentioned by way of example for this purpose. The partly or completely etherified resins mentioned in EP-A 1 505 085 and based on methylolated ethyleneureas, propyleneureas, glyoxaldiureas, malonaldehydediureas or combinations thereof are likewise preferred.

A further outstandingly suitable group of external crosslinking agents are other polyaldehydes, such as aromatic hydrocarbons having two to six aldehyde groups, dialdehyde starches or other water-soluble polyaldehydes, and also the at least partly masked polyaldehydes of EP-A-686,682. These compounds in combination with the cycloaliphatic polyaldehydes used according to the invention can contribute to a higher crosslinking density.

The aromatic polyaldehydes optionally used in the compositions according to the invention are preferably derived from benzene or naphthalene. These polyaldehydes have in particular two to four aldehyde groups. These may be covalently bonded directly to the aromatic nucleus or via a bridge group, for example an alkylene group. Examples of preferred compounds of this type are phthalaldehyde, isophthalaldehyde, terephthalaldehyde, and alkyl-substituted derivatives of these compounds, such as toluenedialdehyde.

Compositions additionally containing at least partly masked polyaldehydes are particularly preferred.

The adhesive dispersion has an acidic pH which is in a range in which the aldehyde groups of the cycloaliphatic polyaldehyde are capable of undergoing acid-catalyzed crosslinking reactions. The pH range is preferably from 2 to 6, in particular from 2.5 to 4.5. A suitable pH may be reached directly after the emulsion polymerization for the preparation of the polymer dispersion or can be subsequently established by addition of acidic compounds. Organic or inorganic Lewis and Brønsted acids are suitable for establishing the pH in the desired acidic range. Preferably suitable Brønsted acids have a $pK_a$ of <2.5, for example hydrochloric acid, sulfuric acid, nitric acid, perchloric acid, p-toluenesulfonic acid, in particular phosphoric acid. The acidic salts of complexible metal ions, in particular aluminum chloride, aluminum nitrate, zirconium oxychloride and titanium sulfate are particularly suitable as the Lewis acid, in particular the acidic salts with polyvalent complexible cations, as mentioned, for example, in DE-B 22 61 402, DE-C 26 20 738 and DE-A 39 42 628.

This product group of pH adjusters is preferably simultaneously capable of forming coordinated bonds or of complex formation with the protective colloids of the polymer dispersion. In particular, the acidic salts of complexible metal ions, in particular aluminum chloride, aluminum nitrate, zirconium oxychloride and titanium sulfate, especially the acidic salts with polyvalent complexible cations, as mentioned, for example, in DE-B 22 61 402, DE-C 26 20 738 and DE-A 39 42 628, are suitable for this purpose.

Compositions in which at least the polymer dispersion, preferably the mixture of components A and B, has a pH of 2 to 6, in particular from 2.5 to 4.5, are preferred.

A specific embodiment of the compositions according to the invention consists in preformulating components A and B and subsequently adding the abovementioned pH adjusters to the combined components A and B.

The solids content of component A or of the polymer dispersion according to the invention is preferably from 20 to 70% by weight, in particular from 30 to 65% by weight.

The preparation of the polymer dispersion is carried out by the customary continuous or batchwise free radical emulsion polymerization procedures.

The procedure for a free radical aqueous emulsion polymerization of ethylenically unsaturated monomers has been frequently described and is therefore sufficiently well known to the person skilled in the art [cf. for example Encyclopedia of Polymer Science and Engineering, vol. 8, pages 659 to 677, John Wiley & Sons, Inc., 1987; D. C. Blackley, Emulsion Polymerisation, pages 155 to 465, Applied Science Publishers Ltd., Essex, 1975; D. C. Blackley, Polymer Latices, $2^{nd}$ Edition, vol. I, pages 33 to 415, Chapman & Hall, 1997; H. Warson, The Applications of Synthetic Resin Emulsions, pages 49 to 244, Ernest Bonn Ltd, London, 1972; D. Diederich, Chemie in unserer Zeit [Chemistry in our Time] 1990, 24, pages 135 to 142, Verlag Chemie, Weinheim; J. Piirma, Emulsion Polymerisation, pages 1 to 287, Academic Press, 1982; F. Hölscher, Dispersionen synthetischer Hochpolymerer [Dispersions of Synthetic High Polymers], pages 1 to 160, Springer-Verlag, Berlin, 1969, and the patent DE-A 40 03 422]. It is usually effected in such a way that the ethylenically unsaturated monomers, are dispersed in an aqueous medium, frequently with concomitant use of dispersants, and polymerized by means of at least one free radical polymerization initiator.

Water-soluble and/or oil-soluble initiator systems, such as peroxodisulfates, azo compounds, hydrogen peroxide, organic hydroperoxides or dibenzoyl peroxide, are used here. These can be used either by themselves or in combination with reducing compounds, such as Fe(II) salts, sodium pyrosulfite, sodium hydrogen sulfite, sodium sulfite, sodium dithionite, sodium formaldehyde sulfoxylate, ascorbic acid, as a redox catalyst system.

The polymeric protective colloids and/or emulsifiers may be added before or during the polymerization. Additional later introduction of polymeric stabilizers and/or of emulsifiers is likewise possible. Additives provided for the desired use are then optionally also added to this dispersion.

Component B of the composition according to the invention is usually a solution of the pure component in a solvent, an emulsion or the pure component itself, preferably the pure component. The components B can generally be readily incorporated into the component A.

The formulation of the compositions according to the invention can be effected in the apparatuses known to the person skilled in the art for this purpose, for example in stirred tanks or suitable mixers. Mixing of the components only shortly before application, for example using inline sprayguns or similar devices, is likewise possible.

After the mixing of the components A and B, the composition according to the invention cures and forms the product cured according to the invention. The curing rate can be influenced by a suitable choice of the formulation. Typical curing times are from 30 minutes to 8 hours.

The curable compositions according to the invention can be processed to give products having very high resistance to boiling water. Without being tied to a theory, it is assumed that the presence of the hydrophobic polyaldehydes positively influences the resistance to boiling water. Since mechanisms which take place in the aqueous phase have to be assumed in the case of the crosslinking reactions, the extent of the observed effect is surprising in that the components B according to the invention are products having very low water solubility.

Adhesive bonds produced from the curable compositions according to the invention have improved water resistance in relation to comparable systems. They therefore satisfy at least durability class D4 according to test standard DIN EN 204 and frequently even surpass this. Their resistance to a plurality of load cycles is to be singled out in particular.

The invention furthermore relates to the use of the composition according to the invention for the adhesive bonding of porous and semiporous substrates.

The specific suitability of the compositions according to the invention lies in the use as an adhesive resistant to boiling water, in particular for cellulosic substrates, such as wood, in particular solid wood or materials derived from wood, and engineering materials, for example veneers, plywood, laminated wood, glued layered wood, densified compressed wood, composite boards or wood fiber materials, such as porous, hard or medium density wood fiber boards (MDF) open to diffusion or plastic-coated decorative wood fiber boards. The dispersions are suitable for manual or mechanical application and in particular also for applications in which the adhesive joints are cured by high-frequency alternating currents.

Further general use examples are waterproof adhesive bonding of paper, board, corrugated board, foam, cement, leather, textile or impregnated laminates.

Other applications are in adhesives for the construction sector, as floor, wall or ceiling adhesive or as furniture film or carpet backing adhesive.

Further areas of suitability are in waterproof binders for wood fiber boards or fiber leather and binders for insulating materials comprising paper fibers or plastic fibers, and furthermore in water-resistant building material dispersions as binders for render or cement.

A further field of use for the compositions according to the invention constitutes binders for textile and nonwoven (so-called engineered fabrics) and in textile printing and as textile finish.

A preferred field of use is the use as a binder for glass fibers which are used, for example, for strengthening plastic tiles, moldings and as insulating material, or as binder for ceramic.

It should be emphasized that the compositions according to the invention are systems which are isocyanate-free.

The following examples serve for illustrating the invention. The parts and percentages stated in the examples are based on weight, unless stated otherwise.

Base Dispersion A1

Mowilith® LDL 2555 W, a commercial product of Celanese Emulsions GmbH, an aqueous polyvinyl acetate dispersion which was prepared by emulsion polymerization and contained a small amount of structural units derived from N-methylolacrylamide, was used. The dispersion contained polyvinyl alcohol as a protective colloid and $AlCl_3$ as an acidic crosslinking catalyst. The pH is from 2.8 to 3.6.

The solids content of the dispersion is 49-51% by weight; the viscosity, determined according to Brookfield, RVT 6/20 is 9000-15 000 mPa·s.

Base Dispersion A2

Mowilith® LDL 1400 W, a commercial product of Celanese Emulsions GmbH, an aqueous dispersion of polyvinyl acetate homopolymer, which dispersion was prepared by emulsion polymerization, was used. The dispersion contained polyvinyl alcohol as a protective colloid and $AlCl_3$ as an acidic crosslinking catalyst. The pH is 2.8-3.2. In addition, the dispersion contained, as a crosslinking agent, a polyaldehyde according to EP-A-0 686 682, masked as a bisulfite adduct. The solids content of the dispersion is 46-50% by weight; the viscosity, determined according to Brookfield, RVT 6/20, is 3000-9000 mPa·s.

Base Dispersion A3

Mowilith® LDL 2530 W, a commercial product of Celanese Emulsions GmbH, an aqueous dispersion of polyvinyl acetate homopolymer, which dispersion was prepared by emulsion polymerization, was used. The dispersion contained polyvinyl alcohol as a protective colloid. In addition, the dispersion contained, as a crosslinking agent, a polyaldehyde according to EP-A-0 686 682, masked as a bisulfite adduct. The solids content of the dispersion is 48-50% by weight; the viscosity, determined according to Brookfield, RVT 6/20, is 8000-16 000 mPa·s. 5 parts of a 54% solution of aluminum chloride hexahydrate in water were added as a crosslinking catalyst to 100 parts of the dispersion. A pH of 2.9 resulted.

EXAMPLES 1 to 6 and COMPARATIVE EXAMPLES C1 to C4

Examples 1 to 3

Base dispersion A1 was mixed as component A with different amounts of TCD-dialdehyde (component B). The compositions of the curable compositions are shown below; the stated amounts of TCD-dialdehyde is based on the total amount of component A.

Example 1: 1% of TCD-dialdehyde
Example 2: 2.5% of TCD-dialdehyde
Example 3: 5% of TCD-dialdehyde

Examples 4 to 6

Base dispersion A2 was mixed as component A with different amounts of TCD-dialdehyde (component B). The compositions of the curable compositions are shown below; the stated amounts of TCD-dialdehyde is based on the total amount of component A.

Example 4: 1% of TCD-dialdehyde
Example 5: 2.5% of TCD-dialdehyde
Example 6: 5% of TCD-dialdehyde

Examples 7 to 8

Base dispersion A1 was mixed as component A with different amounts of vinylcyclohexenedialdehyde (VCHDA; isomer mixture of compounds of the formulae II and IV; component B). The compositions of the curable compositions are shown below; the stated amounts of VCHDA is based on the total amount of component A:

Example 7: 2.5% of VCHDA
Example 8: 5% of VCHDA

Examples 9 to 10

Base dispersion A2 was mixed as component A with different amounts of VCHDA (component B). The compositions of the curable compositions are shown below; the stated amounts of VCHDA are based on the total amount of component A:

Example 9: 2.5% of VCHDA
Example 10: 5% of VCHDA

Comparative Example C1

Base dispersion A1 was used as an adhesive formulation.

Comparative Example C2

Base dispersion A2 was used as an adhesive formulation.

Comparative Example C3

Base dispersion A1 was mixed as component A with a solution of a commercially available polyisocyanate based on diphenylmethane diisocyanate; NCO content about 31%, Desmodur® VK-10 from Bayer AG (component B). The amount of component B was 15% by weight, based on the component A.

Comparative Example C4

Base dispersion A2 was mixed as component A with a solution of a commercially available polyisocyanate based on diphenylmethane diisocyanate; NCO content about 31%, Desmodur® VK-10 from Bayer AG (component B). The amount of component B was 15% by weight, based on the component A.

Example 11

Base dispersion A3 was mixed as component A with 1% of TCD-dialdehyde (component B).

Comparative Example C5

Base dispersion A3 was used as an adhesive formulation.

Testing of Performance Characteristics

The tensile strengths were determined on beech wood test specimens after treatment with boiling water according to test standard DIN EN 204/D4.

The test specimens were produced according to the procedure of DIN EN 205 (formerly DIN 53254). The gluing and testing were carried out taking into account the following characteristics:

| | |
|---|---|
| Glue application: | 150 ± 20 g/m² applied to both sides |
| Open waiting time: | 3 minutes |
| Closed waiting time: | 3 minutes |
| Pressing time: | 2 hours |
| Pressing pressure: | 0.7 ± 0.1 N/mm² |
| Number of test specimens per test sequence: | 20 |
| Test after storage sequence according to DIN EN 204 D4/5: | 7 days in a standard climate*⁾ 6 hours in boiling water 2 hours in cold water |
| Test temperature: | 23° C. ± 2° C. |
| Advance speed: | 50 mm/min |
| Classification in durability class D4/5 was effected at a tensile strength of >=4 N/mm² | |

*⁾23 ± 2° C. and 50 ± 5% relative humidity

The results of the wet adhesive strength tests are shown in the table below. After the end of the test, the fracture pattern of the test specimens was moreover assessed individually and the percentage substrate break (tearing of wood fibers), based on the total adhesively bonded area, was determined. The value stated in the table is the mean value of the percentage tears of all assessed test specimens within a measurement series.

TABLE

| Example | Base dispersion | Addition of curing agent, % based on dispersion | Tensile shear strength according to DIN EN 204 D4/5 (N/mm²) | Fiber tearing in % of adhesively bonded area |
|---|---|---|---|---|
| 1 | A1 | 1 | 6.3 | 40 |
| 2 | A1 | 2.5 | 7.6 | 30 |
| 3 | A1 | 5 | 8.3 | 40 |
| 7 | A1 | 2.5 | 6.3 | 80 |
| 8 | A1 | 5 | 7.2 | 100 |
| C1 | A1 | — | 2.0 | 0 |
| C3 | A1 | 15 | 5.5 | 0 |
| 4 | A2 | 1 | 6.7 | 60 |
| 5 | A2 | 2.5 | 6.5 | 60 |
| 6 | A2 | 5 | 6.7 | 70 |
| 9 | A2 | 2.5 | 6.3 | 70 |
| 10 | A2 | 5 | 6.2 | 60 |
| C2 | A2 | — | 5.0 | 0 |
| C4 | A2 | 15 | 6.6 | 60 |

The comparative examples C3 and C4 not corresponding to the invention relate to an adhesive which contains the commercially available polyisocyanate crosslinking agent Desmodur® VK-10 (Bayer AG) according to the prior art. In comparison, the associated examples according to the invention with the dialdehydes TCD-dialdehyde and VCHDA selected according to the invention have at least comparable, but frequently substantially better, wet adhesive strengths when substantially smaller amounts are used.

Two-cycle boil test on yellow birch veneer on the basis of US standard ANSI/HPVA HP-1-2004 Plywood Test Type I A three-layer test specimen was produced per dispersion sample from North American yellow birch veneer of thickness 1.6 mm. The adhesive bonding was effected with compliance with the following parameters:

| | |
|---|---|
| Glue application: | 150 ± 20 g/m² applied to both sides |
| Open waiting time: | <3 minutes |
| Closed waiting time: | <3 minutes |
| Pressing time: | 4 hours |
| Pressing pressure: | 0.7 ± 0.1 N/mm² |
| Number of test specimens per test sequence: | 4 |
| Test after: | 7 days at 21° C. and 50% relative humidity |

In each case 4 test specimens having the dimension 3·3 inch (7.62·7.62 mm) was sawn out from the test specimen and subjected to the following storage sequence:
1) Treatment for 4 hours in boiling water
2) Subsequent drying for 20 hours at 60+/3° C.
3) Further treatment for 4 hours in boiling water
4) Subsequent drying for 3 hours at 60+/3°

After the end of the storage sequence, the joint opening of the test specimens is visually assessed. A test specimen is considered not to have passed if its joint opening is one inch (2.54 cm) or more throughout. 90% or more of the test specimens per test sequence must pass if the two-cycle boil test is to be considered as having been passed within the type I test for the product.

Results

| Example | Base dispersion | Addition of curing agent, % based on dispersion | Number of test specimens with joint opening >1 inch | Test result |
|---|---|---|---|---|
| 11 | A3 | 1 | 0 out of 4 | Passed |
| C5 | A3 | — | 4 out of 4 | Failed |

The invention claimed is:

1. A composition containing at least one aqueous polymer dispersion, the aqueous polymer dispersion containing
a polymer selected from the group consisting of a homopolymer of a vinyl ester; a copolymer consisting of a vinyl ester and at least one further monomer; a copolymer consisting of more than one vinyl ester and optionally at least one further monomer; a copolymer consisting of a vinyl ester with an ester of an α,β-ethylenically unsaturated $C_3$-$C_8$-mono- or dicarboxylic acid with a $C_1$-$C_8$-alkanol and optionally at least one further monomer; a copolymer consisting of a vinyl ester with an olefin and optionally at least one further monomer; a copolymer consisting of a vinyl ester, ethylene and an ester of an α,β-ethylenically unsaturated $C_3$-$C_8$-mono- or dicarboxylic acid with a $C_1$-$C_8$-alkanol and optionally at least one further monomer; a homopolymer of an ester of an acrylic acid; a homopolymer of an ester of a methacrylic acid; a copolymer consisting of an ester of an acrylic acid and at least one further monomer; a copolymer consisting of an ester of a methacrylic acid and at least one further monomer; a copolymer consisting of styrene with butadiene, and an ester of an α,β-ethylenically unsaturated $C_3$-$C_8$-mono- or dicarboxylic acid with a $C_1$-$C_8$-alkanol and optionally at least one further monomer; and mixtures thereof,
wherein the at least one further monomer is a monomer containing at least one N-functional group, at least one hydroxy functional group, at least one carbonyl group, at least one silane group, at least one epoxide group, or a combination thereof,
wherein the monomer containing at least one N-functional group is selected from the group consisting of (meth)acrylamide, allyl carbamate, acrylonitrile, methacrylonitrile, N-methylolacrylamide, N-methylol methacrylamide, N-methylolallyl carbamate, an N-methylol ester, an alkyl ether or a Mannich base of N-methylolacrylamide, an alkyl ether or a Mannich base of N-methylol methacrylamide, an alkyl ether or a Mannich base of N-methylolallyl carbamate, acrylamidoglycolic acid, methyl acrylamidomethoxyacetate, N-(2,2-dimethoxy-1-hydroxyethyl)acrylamide, N-dimethylaminopropyl(meth)acrylamide, N-methyl(meth)acrylamide, N-butyl(meth)acrylamide, N-cyclohexyl(meth)acrylamide, N-dodecyl (meth)acrylamide, N-benzyl(meth)acrylamide, p-hydroxyphenyl (meth)acrylamide, (N-(3-hydroxy-2,2-dimethylpropyl)methacrylamide, ethylimidazolidone (meth)acrylate, N-(meth)acryloyloxyethylimidazolidin-1-one, N-(2-methacrylamidoethyl)imidazolin-2-one, N-[3-allyloxy-2-hydroxypropyl]aminoethyl]imidozilin-2-one, N-vinylformamide, N-vinylpyrrolidone, and N-vinylethyleneurea, and
wherein the monomer containing at least one carbonyl functional group is selected from the group consisting of diacetoneacrylamide, allyl acetoacetate, vinyl acetoacetate, acetoacetoxyethyl acrylate, and acetoacetoxyethyl methacrylate;
at least one protective colloid or at least one emulsifier, or a mixture thereof; and
at least one cycloaliphatic hydrocarbon having two to six aldehyde groups;
wherein the polymer, the protective colloid, the emulsifier or a combination thereof have groups crosslinkable with the aldehyde groups, the groups crosslinkable selected from the group consisting of activated methylene groups, amino groups, amido groups, ureido groups, hydroxyl groups, and mixtures thereof.

2. The composition as claimed in claim 1, wherein the composition contains at least one component A and at least one component B, the at least one component A having a pH of from 2 to 7 containing the polymer and the at least one protective colloid or the at least one emulsifier or a mixture thereof and the at least one component B containing the cycloaliphatic hydrocarbon having two to six aldehyde groups.

3. The composition as claimed in claim 2, characterized in that the at least one component A has a pH of 2.5 to 4.5.

4. The composition as claimed in claim 1, characterized in that the polymer is selected from the group consisting of a homopolymer of vinyl acetate; a copolymer consisting of vinyl acetate and the at least one further monomer; a copolymer consisting of vinyl acetate and at least one other vinyl ester and optionally the at least one further monomer; a copolymer consisting of a vinyl ester with an ester of acrylic acid, methacrylic acid, fumaric acid, or maleic acid with a $C_1$-$C_8$-alkanol and optionally the at least one further monomer; a copolymer of vinyl acetate with ethylene and optionally the at least one further monomer; a copolymer of a vinyl ester, ethylene and an ester of acrylic acid, methacrylic acid, fumaric acid, or maleic acid with a $C_1$-$C_8$-alkanol and optionally the at least one further monomer; a homopolymer of an ester of acrylic acid; a homopolymer of an ester of methacrylic acid; a copolymer consisting of an ester of acrylic acid and the at least one further monomer; a copolymer consisting of an ester of methacrylic acid and the at least one further monomer; a copolymer consisting of styrene with butadiene, and an ester of acrylic acid or methacrylic acid with a $C_1$-$C_8$-alkanol and optionally the at least one further monomer; and mixtures thereof.

5. The composition as claimed in claim 1, characterized in that the polymer is a polyvinyl ester copolymer which contains at least 50% by weight of vinyl acetate monomer units.

6. The composition as claimed in claim 1, characterized in that the aqueous polymer dispersion contains at least one protective colloid.

7. The composition as claimed in claim 6, wherein the protective colloid comprises polyvinyl alcohol.

8. The composition as claimed in claim 1, characterized in that the at least one cycloaliphatic hydrocarbon contains only two aldehyde groups to provide a cycloaliphatic dialdehyde.

9. The composition as claimed in claim 1, characterized in that the cycloaliphatic hydrocarbon having two to six aldehyde groups is a compound of the formulae I to IX or a mixture of two or more of these compounds

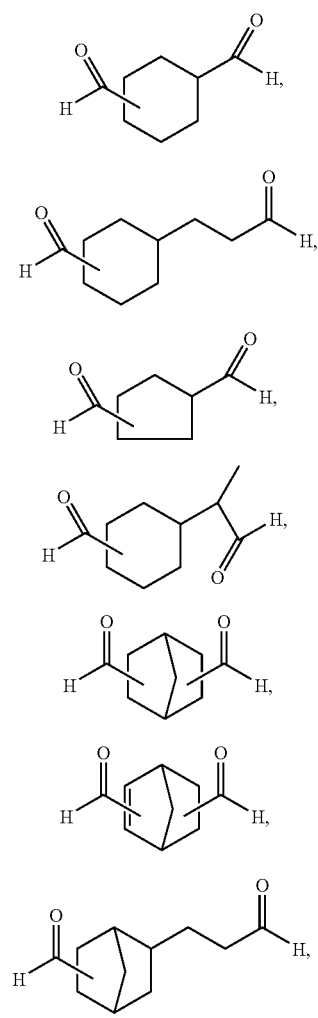

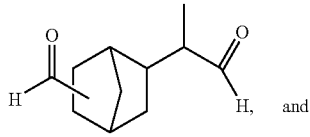

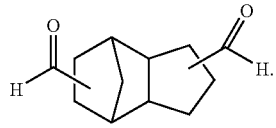

10. The composition as claimed in claim 1, characterized in that the composition contains at least one additive selected from the group consisting of film formation auxiliaries for depressing the minimum film formation temperature, plasticizers, buffers, pH adjusters, dispersants, antifoams, fillers, dyes, pigments, silane coupling agents, thickeners, viscosity regulators, solvents, preservatives and mixtures thereof.

11. The composition as claimed in claim 1, characterized in that the composition contains at least one external crosslinking agent.

12. The composition as claimed in claim 1, characterized in that the composition contains two cycloaliphatic hydrocarbons having two to six aldehyde groups.

13. The composition as claimed in claim 1, characterized in that at least one aldehyde group of the at least one cycloaliphatic hydrocarbon is partly masked.

14. The composition as claimed in claim 1, characterized in that the composition contains a Lewis acid in the form of an acidic salt of a complexible metal ion.

15. The composition as claimed in claim 14, wherein the acidic salt of the complexible metal ion comprises aluminum chloride, aluminum nitrate, zirconium oxychloride, or titanium sulfate.

16. The composition as claimed in claim 14, wherein the acidic salt of the complexible metal ion comprises an acidic salt with polyvalent complexible cations.

17. The composition as claimed in claim 1, wherein the composition has been cured.

18. The composition of claim 1, wherein the composition is an adhesive product.

19. The composition of claim 18, wherein the adhesive product is a paper adhesive, a board adhesive, a corrugated board adhesive, a foam adhesive, a cement adhesive, a leather adhesive, or a textile adhesive.

20. The composition as claimed in claim 1, wherein the composition is a floor adhesive, a wall adhesive, or a carpet backing adhesive.

21. The composition as claimed in claim 1, wherein the composition is a wood adhesive.

22. The composition as claimed in claim 1, wherein the composition is a glass adhesive.

23. The composition as claimed in claim 1, wherein the polymer is a copolymer of a vinyl ester and at least one further monomer containing an N-functional group.

24. The composition as claimed in claim 23, wherein the vinyl ester is a vinyl acetate.

\* \* \* \* \*